(12) United States Patent
Kojima

(10) Patent No.: US 8,290,533 B2
(45) Date of Patent: Oct. 16, 2012

(54) WIRELESS COMMUNICATION NETWORK SYSTEM AND METHOD

(75) Inventor: Yuji Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 345 days.

(21) Appl. No.: 12/824,672

(22) Filed: Jun. 28, 2010

(65) Prior Publication Data

US 2010/0331033 A1  Dec. 30, 2010

(30) Foreign Application Priority Data

Jun. 30, 2009 (JP) .................................. 2009-155928

(51) Int. Cl.
*H04B 7/00* (2006.01)

(52) U.S. Cl. ............ 455/526; 455/522; 455/69; 455/70; 455/509; 455/436

(58) Field of Classification Search .................. 455/522, 455/69–70, 509, 526, 436–450
See application file for complete search history.

(56) References Cited

U.S. PATENT DOCUMENTS

| 2009/0296635 A1* | 12/2009 | Hui et al. ...................... 370/328 |
| 2010/0020852 A1* | 1/2010 | Erell et al. ..................... 375/141 |
| 2012/0083261 A1* | 4/2012 | Hui et al. .................. 455/422.1 |

FOREIGN PATENT DOCUMENTS

| JP | 2001-28775 | 1/2001 |
| JP | 2001-160989 | 6/2001 |

* cited by examiner

*Primary Examiner* — Fayyaz Alam
(74) *Attorney, Agent, or Firm* — Myers Wolin, LLC

(57) ABSTRACT

A wireless communication network system including: a command station for allocating a frequency band, broadcasting a backup station and periodic measurement periods in which a terminal should measure a reception quality, and stopping the allocation of the frequency band to the terminal during the measurement period; one or a plurality of backup stations for synchronizing with the command station and transmitting a measurement signal by using the same frequency channel as that of the command station; and one or a plurality of terminals for measuring a reception quality for each backup station by using the measurement signal.

20 Claims, 12 Drawing Sheets

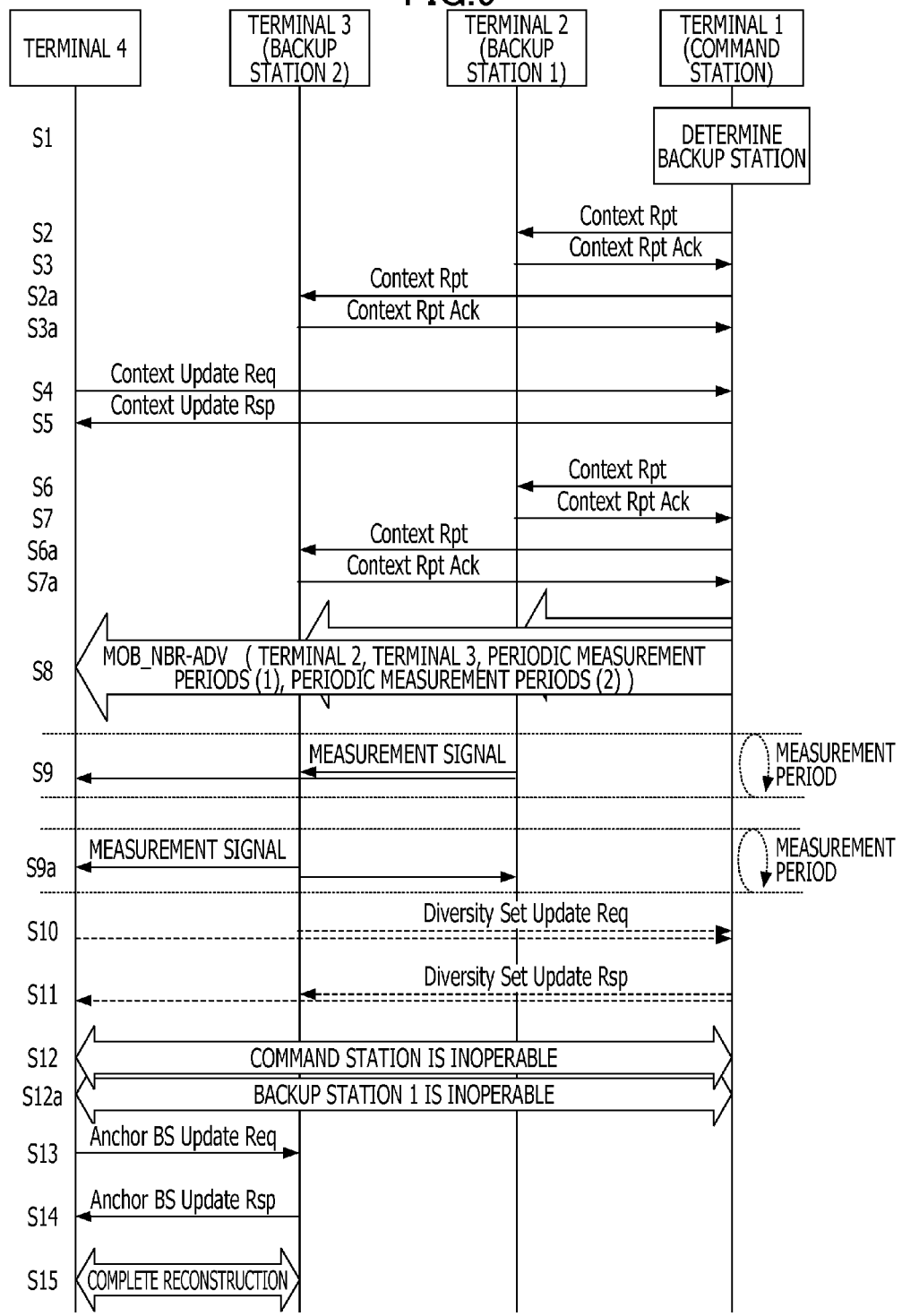

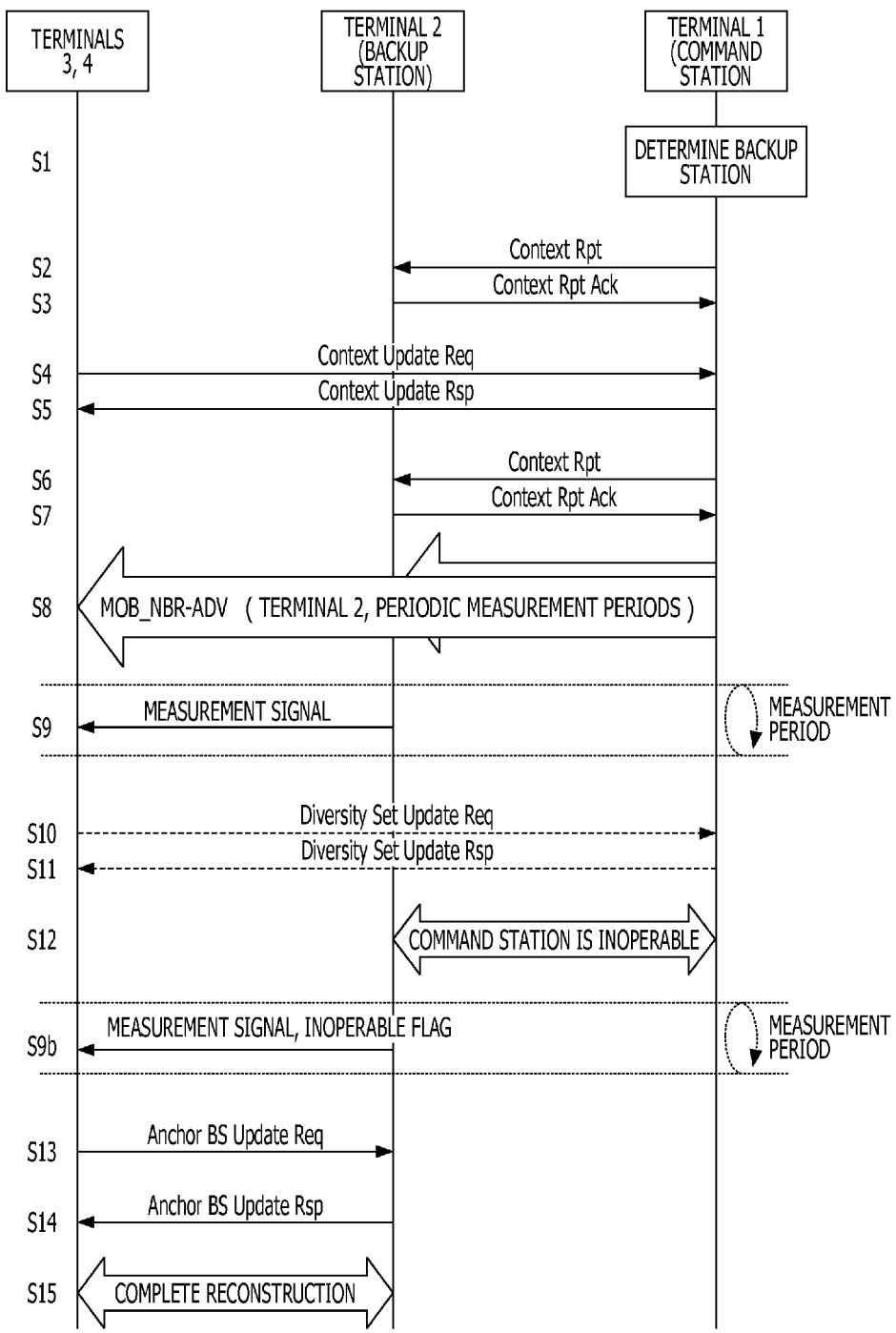

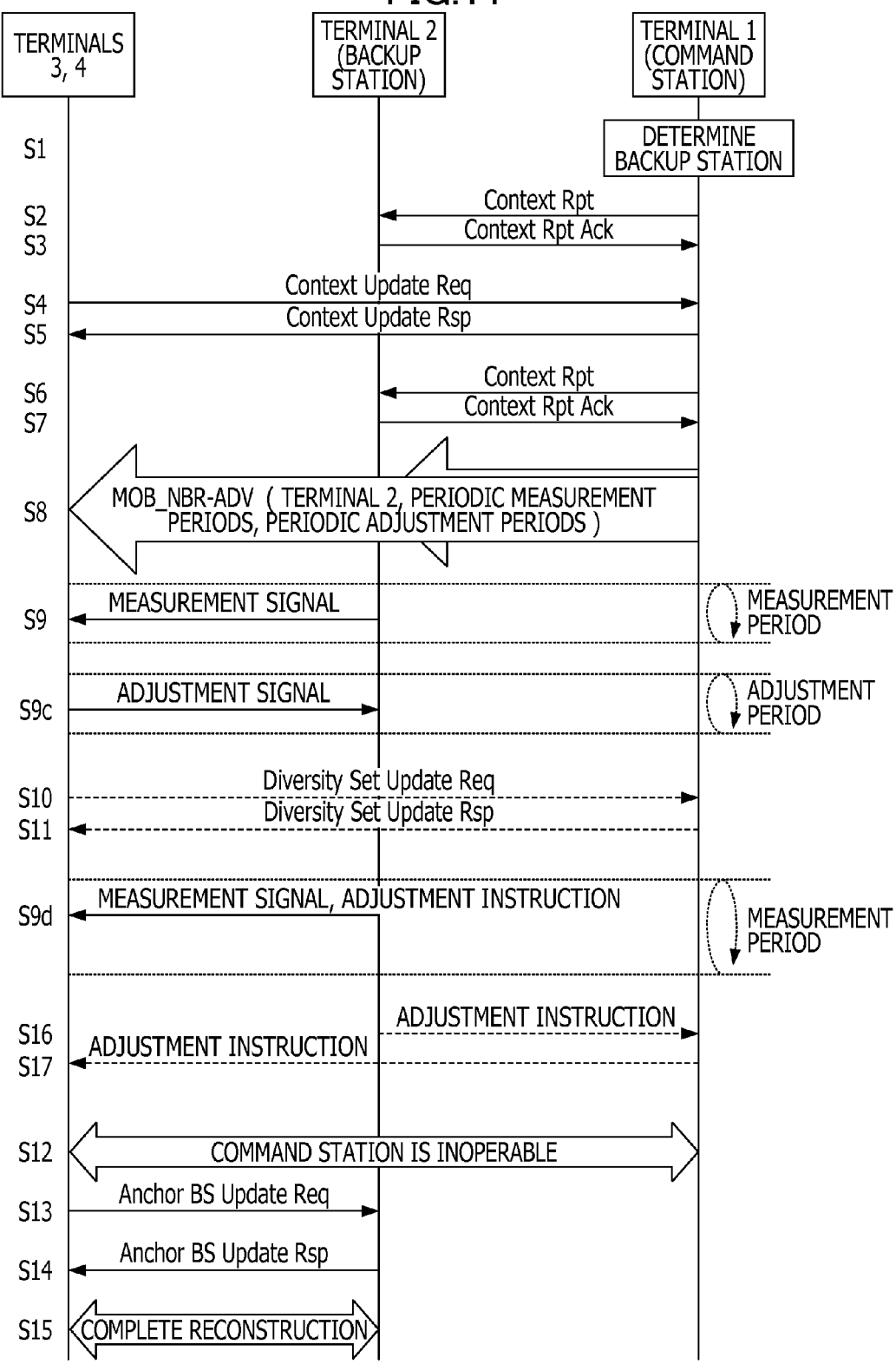

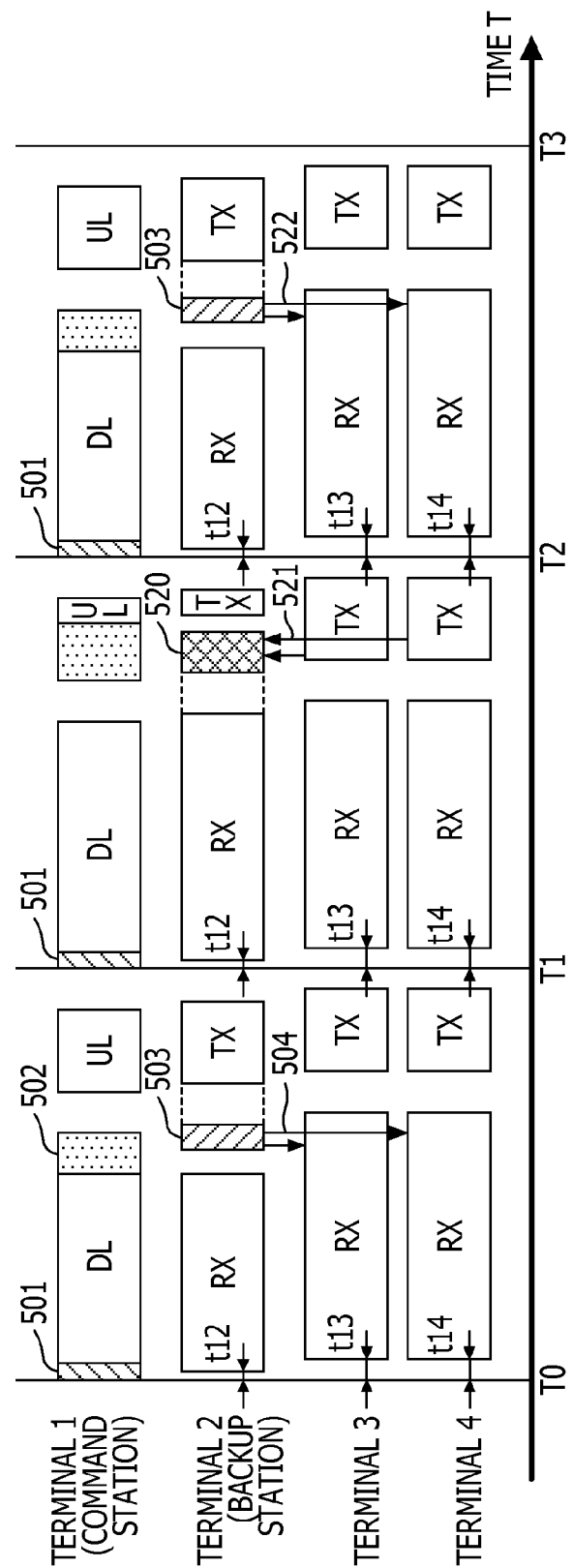

WIRELESS COMMUNICATION NETWORK SYSTEM AND METHOD

CROSS-REFERENCE TO RELATED APPLICATIONS

This application is based upon and claims the benefit of priority from the prior Japanese Patent Application No. 2009-155928 filed on Jun. 30, 2009, the entire contents of which are incorporated herein by reference.

FIELD

The present technology relates to the switching of a command station in a wireless communication network system.

BACKGROUND

[Wireless Communication Network Between Terminals]

It is useful to autonomously construct and operate wireless communication between terminals in a limited geographic area. For example, in a disaster site or the like, autonomous wireless communication constructed between terminals is useful because of reasons such as a wireless communication service provided by a network provider cannot be used due to a failure, speedy and secure communication cannot be realized when the wireless communication service is shared by an unspecified large number of subscribers, and so on.

Such a wireless communication network between terminals is used by, for example, a local government, a police station, a fire department, the self-defense force, and the like. Such a wireless communication network between terminals is also useful for various terminals located in a limited geographic area for various academic, recreational, and commercial activities held indoors and outdoors.

In a wireless communication network in which a terminal moves, a handover technique is required so as to secure communication between terminals.

[Handover Between Base Stations]

In the field of wireless communication networks, a handover technique in which a base station to which a terminal is coupled is switched is known.

In Wireless Local Loop (WLL) using a Fixed Subscriber Unit (FSU), a method for continuously capturing an optimal wireless base station is known. In this method, the FSU periodically measures a reception level of a base station around the FSU, and transmits a message indicating the reception level to the base station. The base station transmits an updated list of base stations that can be assigned to the FSU on the basis of the message. The FSU realizes an assignment by using base stations listed on the updated list.

A method for reducing the time of handover that switches a base station with which a terminal communicates while the terminal is moving is known. In this method, in time-division multiplexing wireless communication, a predetermined number of slots in one frame are allocated to preliminary communication for handover.

In a system based on WiMAX (Worldwide Interoperability for Microwave Access), FBSS (Fast-BS-Switch) is known as a technique in which a terminal synchronizes with a plurality of base stations and fast handover is realized among the base stations.

Japanese Unexamined Patent Application Publication No. 2001-160989 and Japanese Unexamined Patent Application Publication No. 2001-28775 are examples of related art.

SUMMARY

According to an aspect of the invention, a wireless communication network system including: a command station for allocating a frequency band, broadcasting a backup station and periodic measurement periods in which a terminal should measure a reception quality, and stopping the allocation of the frequency band to the terminal during the measurement period; one or a plurality of backup stations for synchronizing with the command station and transmitting a measurement signal by using the same frequency channel as that of the command station; and one or a plurality of terminals for measuring a reception quality for each backup station by using the measurement signal.

The object and advantages of the invention will be realized and achieved by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a sequence diagram of a third embodiment;

FIG. 10 is a sequence diagram of a fourth embodiment;

FIG. 11 is a sequence diagram of a fifth embodiment; and

FIG. 12 is a diagram for explaining a frame configuration transmitted/received to/from a command station, a backup station, and terminals of the fifth embodiment.

DESCRIPTION OF EMBODIMENTS

All the handover techniques described above are techniques used between fixed base stations, and cannot be applied to a wireless communication network between terminals that do not use base stations.

Therefore, it may be useful to provide a new technique for switching between a command station and a backup station of a wireless communication network between terminals.

[System Configuration]

Figure 1:
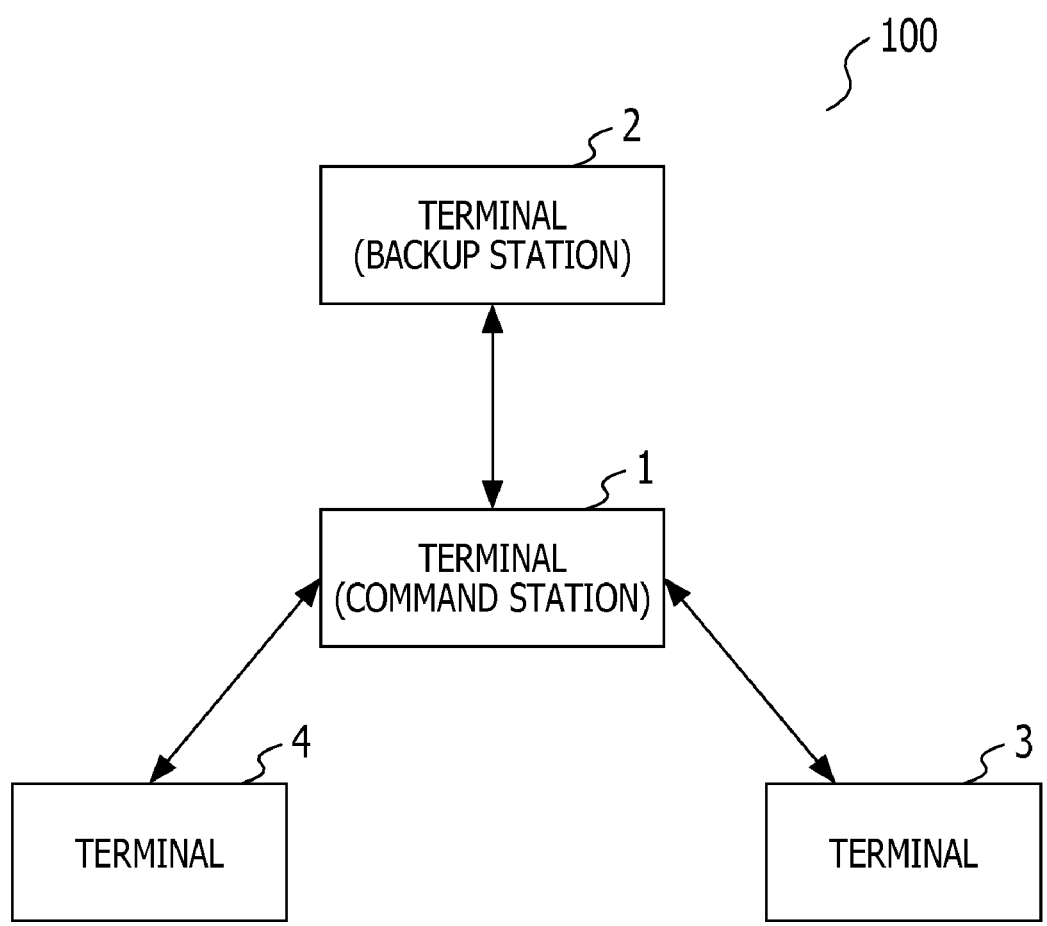
FIG. 1 is a configuration example of a wireless communication network between terminals.

FIG. 1 is a configuration example of a wireless communication network between terminals. The wireless communication network 100 in FIG. 1 includes terminals 1 to 4 having a star configuration.

The terminal 1 is selected as a command station from among a plurality of terminals, and the terminal 1 allocates frequency bands to the other terminals 2 to 4. The terminal 1, which is the command station, receives a registration (INE: Initial Network Entry) from the terminals 2 to 4, and makes a schedule of timings when the terminals 2 to 4 transmit/receive data. The terminal 1 operates as a command station, and also operates as a normal terminal in the same way as the terminals 3 and 4.

Therefore, communication between terminal 1 and the other terminals 2 to 4 is performed directly, and the communication among the terminals 2 to 4 is performed via the terminal 1.

The terminal 1 selects terminal 2 as a backup station which can operate as a command station instead of the terminal 1 when terminal 1 becomes inoperable as a command station due to a failure or the like. The terminals 1 and 2 operate as a command station and a backup station, and also operate as a user terminal in the same way as terminals 3 and 4.

In the description below, an embodiment will be described with reference to the configuration shown in FIG. 1. However, there may be a larger or smaller number of terminals and backup stations.

[Frame Configuration]

As a method for the terminal, which is the command station, to allocate frequency bands to the terminals 2 to 4, an example based on WiMAX will be described below.

Figure 2:
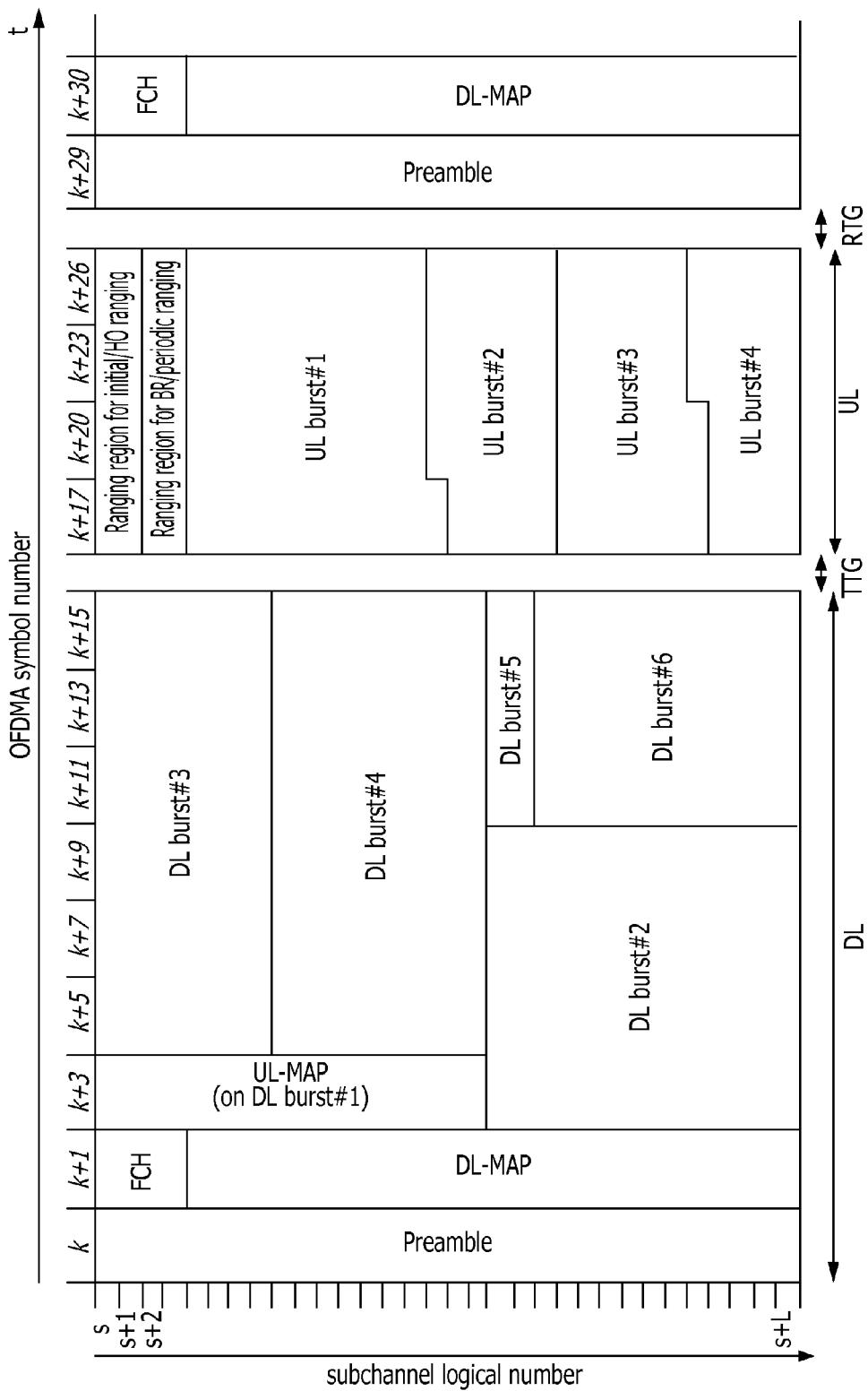
FIG. 2 is an example of an OFDMA frame.

FIG. 2 is an example of an OFDMA frame in WiMAX (Worldwide Interoperability for Microwave Access). In FIG. 2, the horizontal axis shows OFDMA symbol numbers, and indicates a time axis direction. The vertical axis shows sub-channel logical numbers.

The OFDMA frame includes a downstream link subframe, an upstream link subframe, TTG (Transmit/Receive Transition Gap), and RTG (Receive/Transmit Transition Gap).

Further, the DL subframe includes a Preamble, an FCH (Frame Control Header), a DL-MAP, an UL-MAP, and a plurality of DL bursts. The Preamble includes a preamble pattern necessary for the terminals 2 to 4 to realize frame synchronization. The FCH includes information related to a subchannel to be used and the DL-MAP placed just after the FCH. The DL-MAP includes mapping information of the DL bursts in the DL subframe. By receiving and analyzing the DL-MAP, the terminals 2 to 4 can identify the UL-MAP (transmitted by DL burst#1) and the DL-bursts (#2 to #6).

The UL-MAP includes mapping information of Ranging region and the UL bursts in the UL subframe. By reading the UL-MAP, the terminals 2 to 4 can identify the Ranging region and the UL-bursts (#1 to #4).

The burst is assignment and allocation of slots in the downstream subframe and the upstream subframe in downstream user data and control message transmitted to the terminals 2 to 4 and upstream user data and control message transmitted from the terminals 2 to 4, and an area including a combination of the same modulation method and the same FEC (Forward Error Correction). The DL-MAP and the UL-MAP specify the combination of the modulation method and the FEC of each burst. The scheduling result of terminal 1, which is the command station, is transmitted to all the terminals 2 to 4 by using the DL-MAP and the UL-MAP set in the head of the DL subframe.

[Configuration of Command Station]

Figure 3:
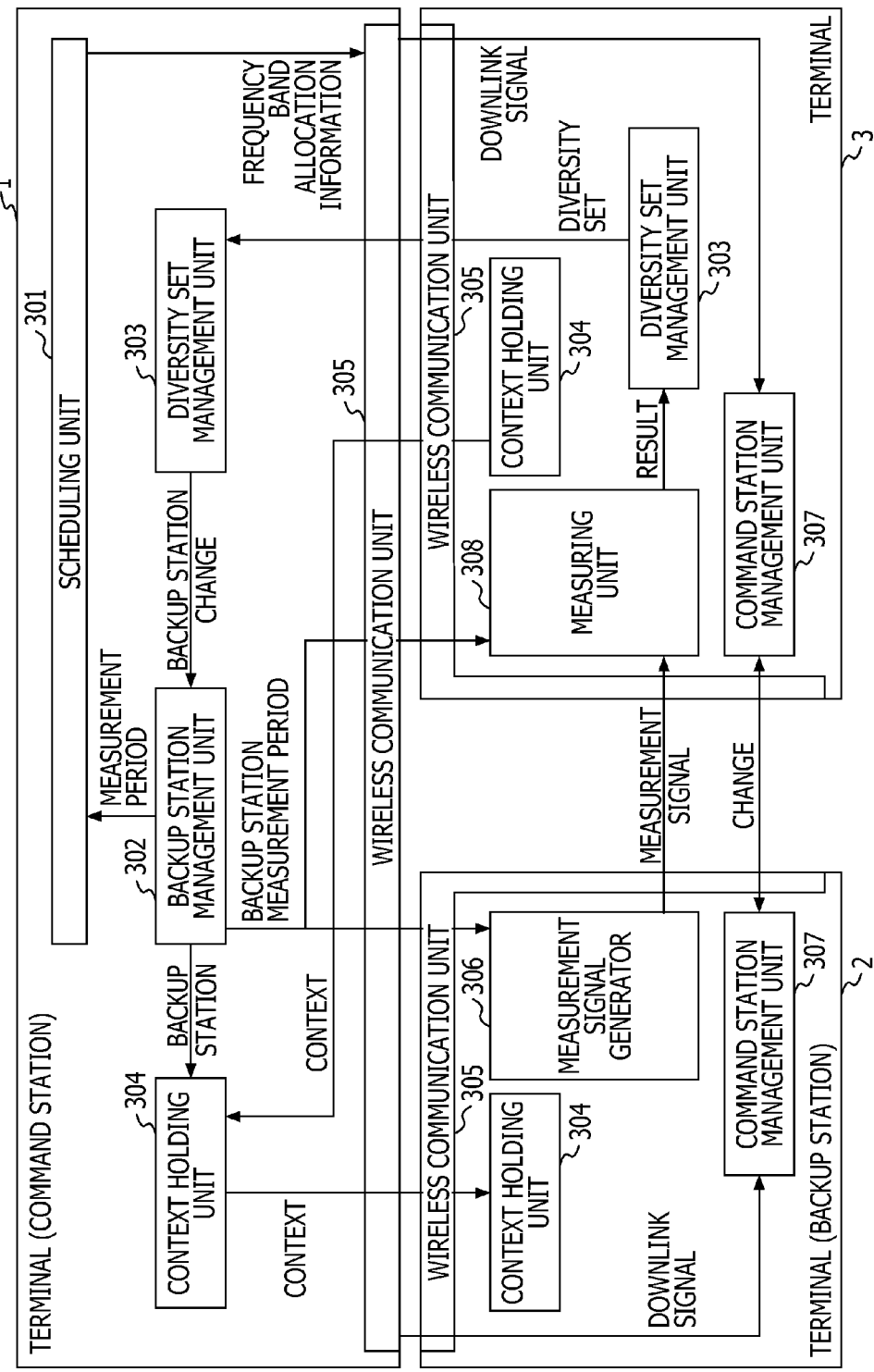
FIG. 3 is a block diagram of a command station, a backup station, and a terminal.

FIG. 3 is a block diagram of the command station, the backup station, and a terminal. The terminals 1 to 3 in FIG. 3 correspond to the terminals 1 to 3 in FIG. 1. Although terminal 4 is not shown in FIG. 3, terminal 4 has the same configuration as that of terminal 3 and is coupled to the command station and the backup station in the same way as terminal 3.

The terminal 1, which is the command station, includes a scheduling unit 301, a backup station management unit 302, a diversity set management unit 303, a context holding unit 304, and a wireless communication unit 305. Since all the terminals 1 to 4 in FIG. 1 may become the command station, the terminals 1 to 4 include the blocks included in the command station shown in FIG. 3.

The scheduling unit 301 allocates frequency bands to the terminals 2 to 4 in FIG. 1. For example, the scheduling unit 301 allocates bursts in the OFDMA frame shown in FIG. 2 to the terminals 2 to 4.

The backup station management unit 302 selects the backup station from the plurality of terminals 2 to 4. For example, the backup station management unit 302 selects the terminal having the best value as the backup station on the basis of the quality of signals received from the terminals 2 to 4, for example, such as a carrier to interference and noise ratio (CINR) and a received signal strength indication or received signal strength indicator (RSSI), remaining battery levels of the terminals 2 to 4, and the like.

If necessary, the backup station management unit 302 selects a plurality of backup stations and sets priorities on them. For example, the backup station management unit 302 selects a plurality of backup stations having reception quality greater than a certain threshold value, and sets priorities in order from the one having a highest reception quality.

The backup station management unit 302 changes the backup station when the backup station management unit 302 receives notification indicating that a diversity set, which is a list of backup stations of the terminals 3 and 4, has been changed from the diversity set management unit 303. For example, when any one of the terminals 3 and 4 deletes the terminal 2 from the diversity set of the terminal due to deterioration of reception quality from terminal 2, and adds another terminal as the backup terminal, the backup station management unit 302 selects the added terminal as the backup terminal.

The backup station management unit 302 notifies the context holding unit 304 of the selected backup station by an identifier of the backup station or other information identifying the backup station.

Further, the backup station management unit 302 determines periodic measurement periods in which the terminals 3 and 4 should measure the reception quality. The periodic measurement periods are specified by, for example, the frame number, time, or a time cycle such as every 30 minutes. The backup station management unit 302 broadcasts the backup station and the periodic measurement periods in which the reception quality should be measured to the plurality of terminals 2 to 4.

The diversity set management unit 303 holds the diversity set of each terminal 2 to 4. Further, each terminal 2 to 4 holds a list of backup stations with which the terminal can synchronize by using the same parameter as the diversity set. The diversity set management unit 303 of each terminal 2 to 4 notifies the diversity set management unit 303 of the command station of the diversity set by using, for example, a Diversity Set Update Request message or an MOB_MSHO-REQ (Mobile MS Handover Request) message.

The context holding unit 304 holds a context which is information related to the terminal such as security information. The context includes, for example, an encryption method and a decryption method which the command station uses to communicate with the terminals 2 to 4. The contexts of the terminals 2 to 4 are created when each terminal 2 to 4 is initially registered with the command station, for example, when each terminal 2 to 4 is turned on.

The context holding unit 304 of the command station transmits the contexts of the terminals 3 and 4 held by the context holding unit 304 of the command station to the context holding unit 304 of the backup station. Based on this, the command station and the backup station share the contexts of the terminals 3 and 4.

The wireless communication unit 305 provides communication between the above blocks 301 to 304 and the terminals 2 to 4 including the backup station via a wireless connection.

[Configuration of Backup Station]

FIG. 3 is a block diagram of the command station, the backup station, and the terminal. The terminal 2, which is the backup station, includes the context holding unit 304, the wireless communication unit 305, a measurement signal generator 306, and a command station management unit 307. Since all the terminals 1 to 4 may become the backup station, the terminals 1 to 4 include the blocks included in the backup station shown in FIG. 3.

The measurement signal generator 306 receives notification of the backup station and the periodic measurement periods from the backup station management unit 302 of the command station. When the notified backup station indicates the terminal itself, the measurement signal generator 306 knows that the terminal itself is selected as the backup station.

The measurement signal generator 306 transmits a signal for the terminals 3 and 4 to measure the reception quality during the periodic measurement periods. For example, when the terminals 3 and 4 measure the CINR, the measurement signal generator 306 generates a predetermined pattern as a preamble signal of the OFDMA frame. The measurement signal generator 306 transmits the generated preamble signal in accordance with timings identified by the command station, for example when the command station transmitted frames including timing information.

The context holding unit 304 of the backup station holds the contexts of the terminals 3 and 4 received from the context holding unit 304 of the command station. Based on this, when the terminal 1 becomes inoperable as the command station due to a failure or the like, terminal 2 can start operation as the command station by using the contexts of the terminals 3 and 4.

The command station management unit 307 monitors a downlink signal transmitted by the command station. When the command station management unit 307 detects that the downlink signal from the command station is not received, the command station management unit 307 determines that the command station is inoperable, and the backup station starts operation as the command station. Therefore, terminal 2 has the configuration shown in FIG. 3, and the scheduling unit 301 allocates frequency bands to the terminals 3 and 4.

The wireless communication unit 305 provides communication between the above blocks 304 to 307 and the terminals 1, 3, and 4 including the command station via a wireless connection.

[Configuration of Terminal]

The terminal 3 in FIG. 3 includes the diversity set management unit 303, the context holding unit 304, the wireless communication unit 305, the command station management unit 307, and a measuring unit 308. All the terminals 1 to 4 include the blocks included in the terminals shown in FIG. 3.

The measuring unit 308 receives a broadcast of the backup station and the periodic measurement periods from the backup station management unit 302 of the command station. During the periodic measurement periods, the measuring unit 308 of the terminal receives a signal for measurement, and measures the reception quality of the signal for measuring transmitted by the backup station as described above. When the command station broadcasts a plurality of backup stations and a plurality sets of periodic measurement periods corresponding to each backup station, the measuring unit 308 measures the reception quality during a set of measurement periods for each backup station.

As a measuring method, for example, the measuring unit 308 calculates CINR from the preamble signal of the OFDMA frame transmitted by the backup station. Or, the measuring unit 308 may calculate the reception quality of the backup station on the basis of the received signal strength indicator or the like.

The measuring unit 308 notifies the diversity set management unit 303 of the measurement result, which is the reception quality measured for the backup station.

The diversity set management unit 303 of terminal 3 holds the diversity set of terminal 3 itself. The terminal 3 holds a list of backup stations with which terminal 3 can synchronize by using the same parameter as a diversity set.

The diversity set management unit 303 of terminal 3 determines the one or more backup stations to be held in the diversity set on the basis of the result received from the measuring unit 308. For example, the diversity set management unit 303 adds a backup station having reception quality greater than a certain threshold value to the diversity set, and deletes a backup station having reception quality smaller than a certain threshold value from the diversity set.

The diversity set management unit 303 of terminal 3 notifies the diversity set management unit 303 of the command station of the diversity set held by terminal 3 by using, for example, a Diversity Set Update Request message or an MOB_MSHO-REQ (Mobile MS Handover Request) message.

The command station management unit 307 monitors the downlink signal transmitted by the command station. When the command station management unit 307 detects that the downlink signal from the command station is not received, the command station management unit 307 determines that the command station is inoperable, and starts operation by using a backup station having the highest priority as a new command station in accordance with the priority order of backup stations broadcasted by the command station.

In the example of FIG. 1, it is assumed that the command station management units 307 of the terminals 2 to 4 detect that terminal 1, which is the command station, becomes inoperable. The terminal 2 switches from the backup station to the command station, and the scheduling unit 301 of terminal 2 allocates frequency bands to the terminals 3 and 4. The terminals 3 and 4 select a command station from the backup stations included in the diversity set in accordance with the priority order of backup stations broadcasted by the new command station. The terminals 3 and 4 transmit a message to the new command station by using the allocated frequency band. The message to the new command station may be, for example, an Anchor BS message can be used in a system based on WiMAX.

The wireless communication unit 305 provides communication between the above blocks 303 to 308 and the terminals 1, 2, and 4 including the command station and the backup station via a wireless connection.

The context holding unit 304 of terminal 3 holds a context which is information related to terminal 3 itself such as security information. The context includes, for example, an encryption method and a decryption method which terminal 3 uses to communicate with the command station or the backup station. The context holding unit 304 of terminal 3 transmits the context to the command station when terminal 3 initially registers with the command station, for example, when terminal 3 is turned on.

While the operation of terminal 3 is described above, the operation of terminal 4 is the same as that of terminal 3.

First Embodiment

A first embodiment will be described with reference to a sequence diagram shown in FIG. 4. Hereinafter, the embodiment will be described using the network configuration in FIG. 1, the frame configuration in FIG. 2, and the configurations of the command station, the backup station, and the terminal in FIG. 3.

In step S1, the backup station management unit 302 of terminal 1, which is the command station, determines the backup station by using the method as described in [Configuration of Command Station]. In the embodiment, terminal 2 is selected as the backup station. In the command station, the backup station management unit 302 transmits information of the determined backup station to the context holding unit 304. As the information of the backup station, any information can be used if the information can identify the backup station.

In step S2, the context holding unit 304 of the command station transmits the contexts of the other terminals to terminal 2 which is the backup station via the wireless communication unit 305. When transmitting the contexts, for example, a Context Rpt (Context Report) message may be used. In this way, the command station and the backup station can share the contexts of other terminals, specifically the contexts of the terminals 3 and 4. Each terminal 3 and 4 needs to transmit its own context only to the command station, and need not transmit the context to the backup station. Therefore, it is possible to decrease an amount of data transmitted/received between the terminals 3 and 4 and a new command station when the command station switches.

In step S3, the terminal 2, which is the backup station, sends a reception acknowledgment as a response to the received context. When sending the acknowledgment, for example, a Context Rpt Ack (Context Report Acknowledgement) message is used.

In the contexts, there are contexts which need to be updated in real time, and contexts which need not be updated in real time. The contexts which need to be updated in real time are, for example, various timer values, packet transmission counter values used in encryption, and the like. The contexts which need not be updated in real time are, for example, functions supported by the terminal, a method for encrypting data, connection information between the command station and the terminal, and the like.

The context holding unit 304 of the backup station holds the received contexts. The backup station timely updates the contexts which need to be updated in real time in the held contexts. For example, when updating a timer value, the backup station counts up the timer value held by the backup station. Since the command station also timely updates the timer value, as a result, the command station and the backup station share the same value with respect to this context. In this way, sharing of a context which cannot be updated in time by transmitting/receiving a message can be realized.

In step S4, when a context held by the context holding unit 304 of the terminals 3 and 4 is updated, the context holding unit 304 requests the context holding unit 304 of the command station to update the context. An update of a context occurs, for example, when a new connection is added between the command station and a terminal. A request to update a context is performed, for example, by a connection add message when adding a connection, and a function exchange message when changing a supported function. In other words, the update of a context depends on processing which causes the update of the context, and is performed by a message suitable for the processing. In FIG. 4, such messages are represented as a Context Update Req (Context Update Request) message.

In step S5, the command station responds to the received context. In FIG. 4, in the same manner as in step S4, various response messages are represented as the Context Update Rsp (Context Update Response) message. The context holding unit 304 of the command station updates and holds the context on the basis of the request received in step S4.

In steps S6 and S7, the command station shares the updated context with the backup station in the same procedure as in steps S2 and S3.

As shown in the procedure of steps S4 to S7, when a context which need not be updated in real time is changed, using this change as a trigger, the context holding unit 304 of the terminals 3 and 4 transmits/receives a control signal to/from the context holding unit 304 of the command station. In this way, the sharing of the context between the command station and the backup station can be realized.

Owing to steps S2 to S7, when the command station becomes inoperable, it is not necessary to exchange context between each terminal and the backup station, and thus switching from the command station to the backup station can be performed quickly.

In step S8, the backup station management unit 302 of the command station broadcasts a fact that the backup station is terminal 2, and the periodic measurement periods in which the terminals should measure the reception quality of the backup station. For example, in a system based on WiMAX, the command station uses a Neighbor Base Station Advertisement (MOB_NBR-ADV) message for broadcast.

The periodic measurement periods may be broadcasted when the backup station is determined, when the backup station is changed, when the periodic measurement periods in which the reception quality should be measured are changed, or when a new terminal is coupled to the wireless communication network, or the periodic measurement periods may be broadcasted periodically.

The measurement signal generator 306 of the backup station receives a broadcast including the backup station and the measurement periods from the backup station management unit 302 of the command station. The measurement signal generator 306 determines whether or not the terminal itself is the backup station from the broadcast backup station.

The measuring unit 308 of the terminals 3 and 4 receives a broadcast including an indication of the backup station and the measurement periods from the backup station management unit 302 of the command station. The measuring unit 308 of terminals 3 and 4 recognizes that terminal 2 is the backup station from the broadcast.

The backup station management unit 302 of the command station transmits the measurement periods to the scheduling unit 301.

In step S9, the measurement signal generator 306 of the backup station transmits a reception quality measurement signal which synchronizes with the command station and is in the same frequency channel as that of the command station via the wireless communication unit 305. The backup station and the terminals receive the command station's radio waves which synchronize with the command station and are in the same frequency channel as the frequency channel used by the command station, and the backup station and the terminals continuously receive the signal even after the measurement period. Therefore, it is preferable that the measurement signal synchronizes with the command station and is in the same frequency channel as that of the command station.

The reception quality measured by the terminals 3 and 4 includes, for example, the CINR. A signal transmitted by the backup station for the terminals 3 and 4 to measure the CINR includes, for example, the preamble signal. As shown in FIG. 2, the preamble signal is provided at the head of each frame by the command station. The terminals 3 and 4 receive the preamble signal and synchronize a transmission/reception timing of a frame transmitted/received by the terminals 3 and 4 with the transmission/reception timing of the frame of the command station with reference to the preamble signal. Also, the terminals can measure the CINR of the station which transmits the preamble signal from the received preamble signal.

The scheduling unit 301 of the command station stops the allocation of the frequency bands to the terminals 3 and 4 during the measurement period. Based on this, the terminals need not transmit/receive radio waves to/from the command station, and thus, during the measurement period, the measuring unit 308 of the terminals can receive the measurement signal from the backup station via the wireless communication unit 305. On the other hand, the measurement signal generator 306 of the backup station also need not transmit/receive radio waves to/from the command station, and thus, during the measurement period, the measurement signal generator 306 of the backup station can transmit the measurement signal.

Figure 5:
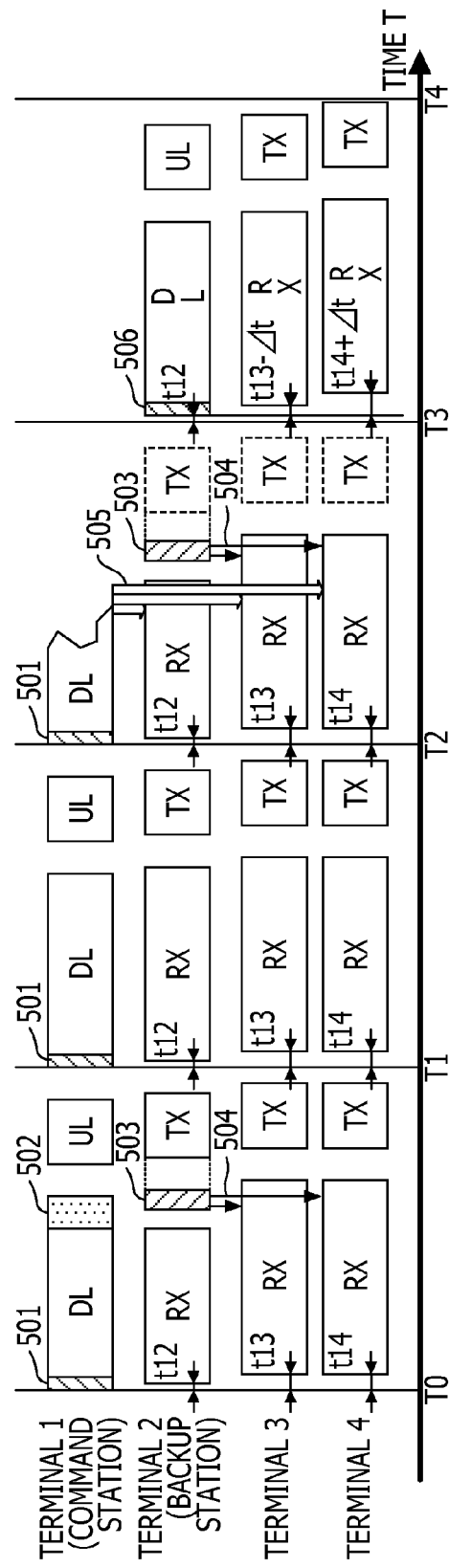
FIG. 5 is a diagram for explaining a frame configuration transmitted/received to/from a command station, a backup station, and terminals of the first embodiment.

A configuration of the frame transmitted/received among the command station, the backup station, and the terminals will be described with reference to FIG. 5. As shown in FIG. 5, one frame has a downlink (DL) period in which the command station transmits radio waves and an uplink (UL) period in which the command station receives radio waves. One frame is transmitted/received respectively in a period T0-T1, a period T1-T2, a period T2-T3, and a period T3-T4. The detailed configuration of each frame is as shown in FIG. 2. As shown in FIG. 5, in one frame, while the command station transmits a DL signal, the backup station and the terminals are in a reception mode (RX: Receive exchange). On the other hand, while the command station receives an UL signal, the backup station and the terminals are in a transmission mode (TX: Transmit eXchange).

The backup station management unit 302 of the command station sets the timing in which the backup station and the terminals switch from the RX to the TX as a measurement period 503. The measurement signal generator 306 of the backup station transmits a measurement signal 504 during the management period 503. As described above, the measurement signal 504 may be the preamble signal 501. In this way, by setting the timing of switching from RX to TX as the measurement timing 503, it is possible to avoid occurrence of unnecessary switching between RX and TX in the backup station and the terminals.

As shown in FIG. 5, during the period 502 including the measurement period 503, the command station stops the allocation of the frequency bands to the backup station and the terminals. This is realized when the scheduling unit 301 of the command station transmits frequency band allocation information to the wireless communication unit 305. The period between DL and UL, the period between RX and TX, and margins before and after the measurement period are a guard time necessary for switching of the transmission/reception mode. The measurement period 503 has to be set considering the guard time.

The reason why the measurement period 503 is not included in the T1-T2 frame is because the T1-T2 frame does not correspond to the periodic measurement periods in which the reception quality should be measured.

Figure 4:
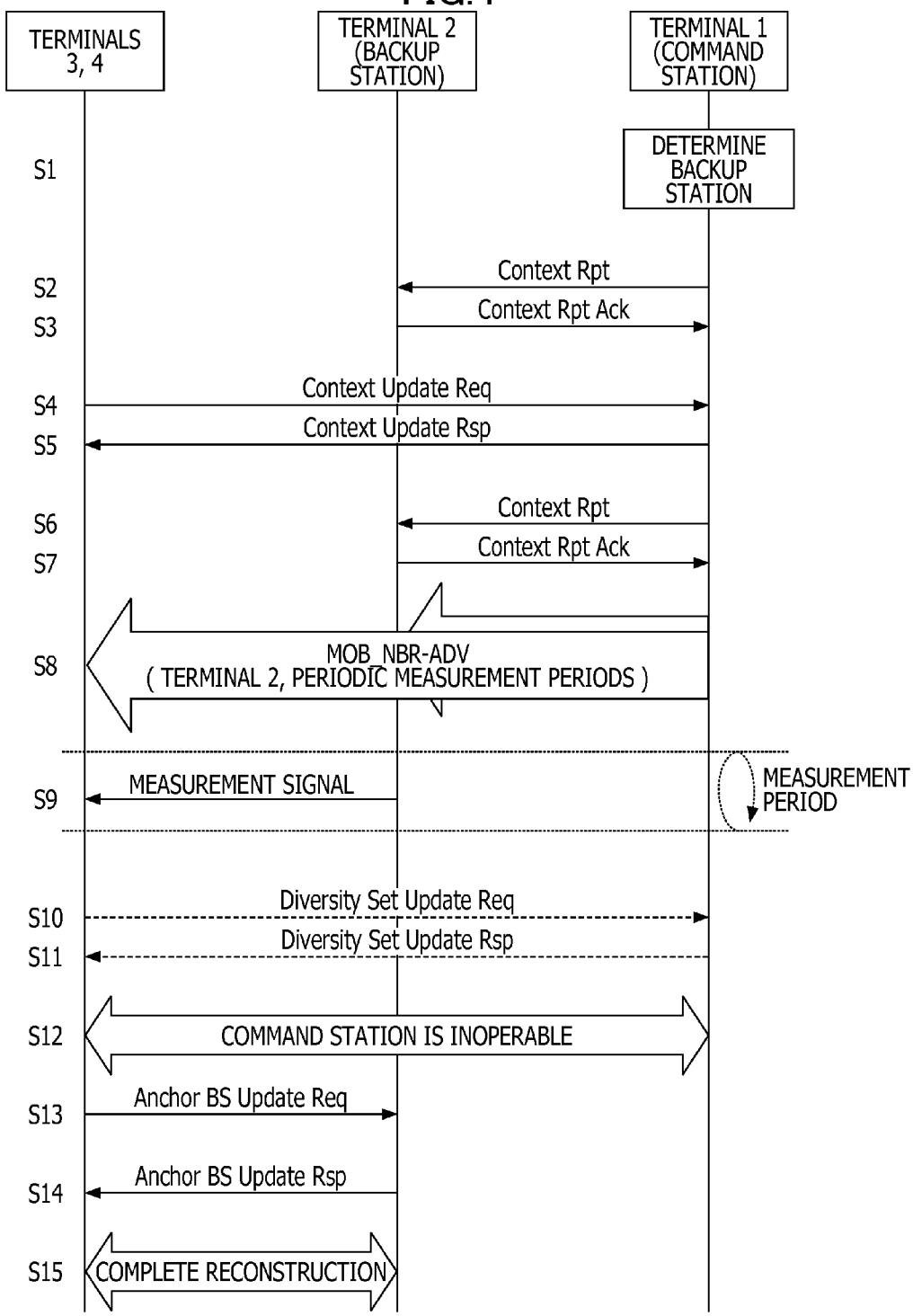
FIG. 4 is a sequence diagram of a first embodiment.

The measurement in step S9 in FIG. 4 is periodically repeated.

Owing to steps S8 and S9, when the command station becomes inoperable, each terminal need not perform processing to select a best suited backup station and processing to establish synchronization between each terminal and the backup station, and thus switching from the command station to the backup station can be performed quickly.

In step 10, the diversity set management unit 303 of the terminals 3 and 4 determine whether or not the diversity set has to be updated on the basis of the measurement result received from the measuring unit 308. As described above, the diversity set includes a synchronization parameter (synchronization information) for synchronizing with other stations (in this embodiment, the command station and the backup station), and the diversity set is a list of other stations that can be synchronized by the synchronization parameter.

The diversity set management unit 303 of the terminals 3 and 4 includes a backup station in the diversity set when the reception quality of the backup station is greater than a predetermined threshold value, and excludes a backup station from the diversity set when the reception quality of the backup station is smaller than a predetermined threshold value. In this way, the terminals 3 and 4 stores the backup station and the synchronization information for synchronizing with the backup station as the diversity set, and updates the diversity set as needed. Basically, the backup station is expected to be included in the diversity set, although depending on the determining method of the backup station. When an update of the diversity set occurs, the diversity set management unit 303 of the terminals 3 and 4 transmits information of the updated diversity set to the diversity set management unit 303 of the command station via the wireless communication unit 305.

The diversity set management unit 303 of the command station holds the diversity sets of the terminals 3 and 4. Although depending on the determining method of the backup station, the diversity set management unit 303 of the command station requests the backup station management unit 302 to change the backup station in accordance with a change of the diversity set.

For example, when terminal 3 cannot obtain sufficient reception quality from terminal 2 which is the current backup station, terminal 3 excludes terminal 2 from the diversity set of terminal 3. In this case, it is desirable that the diversity set management unit 303 of the command station changes the backup station. The terminal 3 notifies the command station of the change of the diversity set by using, for example, a Diversity Set Update Request message or an MOB_MSHO-REQ (Mobile MS Handover Request) message.

In step S11, the command station responds to notification of the change of the diversity set. The command station responds to the terminal by using, for example, a Diversity Set Update Response message or an MOB_BSHO-RSP (Mobile BS Handover Response) message.

It is assumed that the command station becomes inoperable in step S12. The command station management units 307 of the backup station and the terminals monitor the downlink signal of the command station. When the command station management unit 307 detects that the downlink signal is not received for a predetermined time period, the command station management unit 307 determines that the command station becomes inoperable, and the backup station newly becomes the command station. The terminal 2, which newly becomes the command station, makes a schedule of timings of data transmission/reception to/from the terminals 3 and 4, transmits the downlink signal to the terminals 3 and 4, and receives the uplink signal from the terminals 3 and 4.

In steps S13 and S14, the command station management units 307 of the backup station (the terminal 2 which newly becomes the command station in step S12) and the terminals 3 and 4 transmit/receive a control signal notifying that the command station is changed. The control signal is transmitted/received by, for example, an Anchor BS Update Request/Response message which notifies a base station that an anchor base station is updated to another base station in FBSS used in WiMAX, or MOB_MSHO-REQ/MOB_BSHO-RSP which is also a message notified to a base station.

An operation for switching the command station will be described with reference to FIGS. 5 and 6.

Figure 6:
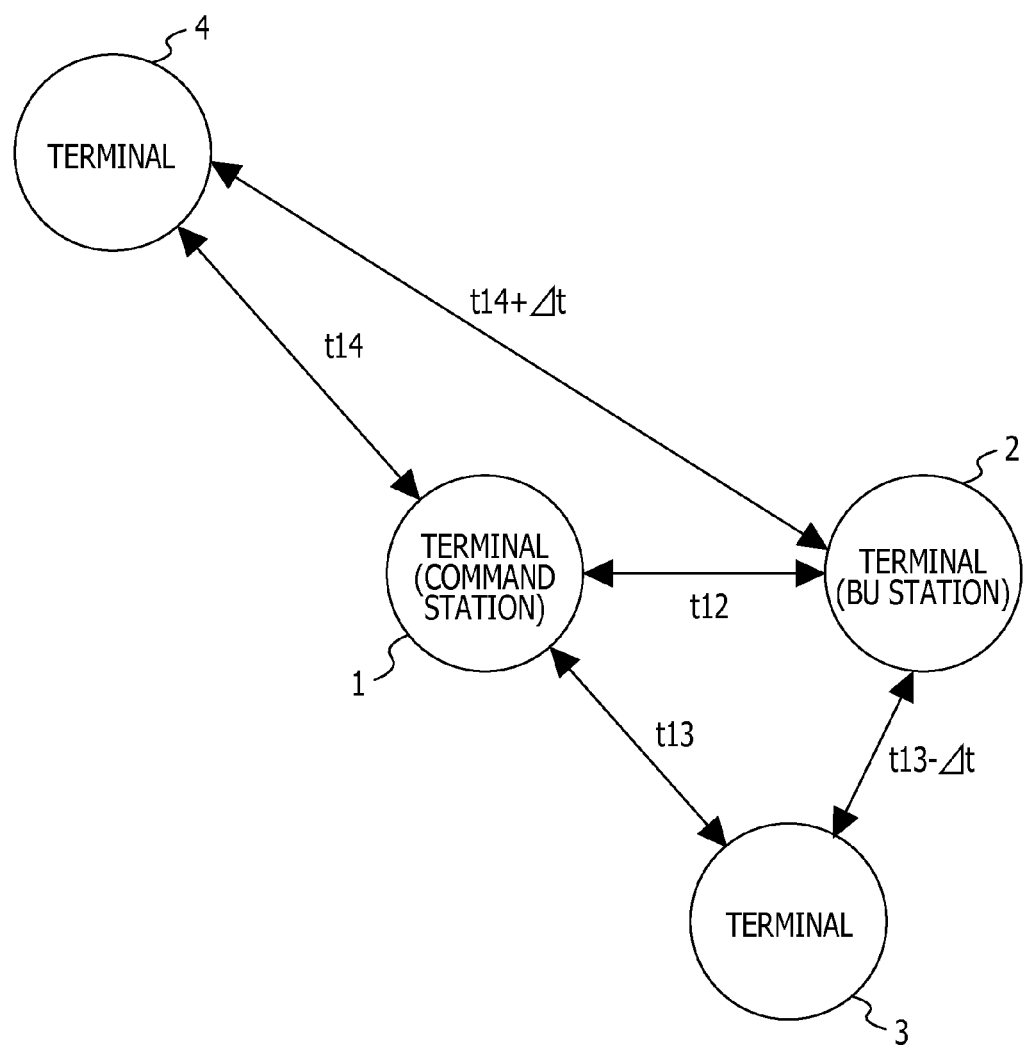
FIG. 6 is a diagram for explaining physical positions among terminals.

FIG. 6 is a diagram for explaining physical positions among terminals. In FIG. 6, the terminal 1, which is the command station, is located approximately at the center between terminal 3 and terminal 4. Time t13 indicates a delay time between terminal 1 and terminal 3. Time t14 indicates a delay time between terminal 1 and terminal 4. The terminal 2, which is the backup station (BU station), is located nearer to terminal 3 than to terminal 4. Time $\Delta t$ is a time difference with respect to t14 or t13. The terminal 2, which is the backup station (BU station), is located nearer to the command station than terminal 3 and terminal 4. Time t12 indicates a delay time between terminal 1 and terminal 2. When transmitting/receiving frames in a network configuration among terminals as described above, the frame configuration becomes as shown in FIG. 5.

As shown in FIG. 5, in the period T0-T1, the period T1-T2, and the period T2-T3, the backup station receives radio waves from the command station with a delay of t12. The terminal 3 and terminal 4 receive radio waves from the command station with a delay of t13 and t14 respectively. These delays are generated by a physical propagation time of radio waves. The backup station and the terminals synchronize the timing for transmitting/receiving a frame to/from the command station by taking the delay times into consideration.

When the command station becomes inoperable in the period T2-T3 (505), the backup station starts transmitting frames as a command station from time T3 at timings corresponding to the timings at which the command station before becoming inoperable starts transmitting frames. Since the backup station synchronized with the command station, the backup station can start transmitting frames at the timings described above.

On the other hand, terminal 3 and terminal 4 start receiving frames from the backup station from time T3. In this case, for example, it is a question when terminal 3 starts receiving frames while expecting that the frames reach terminal 3. Since terminal 3 synchronized with the command station by taking a delay time of t13 into consideration, if terminal 3 starts receiving frames from the backup station at the timing synchronized with the command station, actually the frames arrive at terminal 3 time $\Delta t$ earlier than expected. However, considering characteristics of modulation method of wireless communication, if the $\Delta t$ is smaller than a certain value, terminal 3 can decode the signal from the backup station regardless of the difference $\Delta t$. A maximum value of the $\Delta t$ described above is determined depending on the modulation method of wireless communication.

Even when the $\Delta t$ is somewhat greater than the maximum value described above, terminal 3 can eventually decode the signal from the backup station. Since terminal 3 receives the measurement signal (for example, the preamble signal 501) for measuring the reception quality from the backup station during the measurement period, on the basis of the receiving timing during the measurement period, terminal 3 can receive frames from the backup station after the time T3 by finely adjusting the receiving timing that has been synchronized with the command station by taking the difference of $\Delta t$ into account.

However, if the time $\Delta t$ is too large, terminal 3 has to re-perform the synchronization procedure specified in the wireless communication method from the beginning, and establish synchronization again. In this case, terminal 3 eliminates the backup station from the diversity set on the basis of the measurement result of the backup station. Although depending on the selecting method of the backup station, it is necessary to re-select the backup station.

The terminal 4 operates in the same way as terminal 3.

In summary, the terminal keeps a backup station in the diversity set as a station with which the terminal can synchronize within an allowable delay time, so that the terminal can synchronize with the backup station immediately after the command station becomes inoperable.

In step S15 in FIG. 4, reconstruction of the network among the terminals, in other words, switching of the command station is completed.

Figure 7:
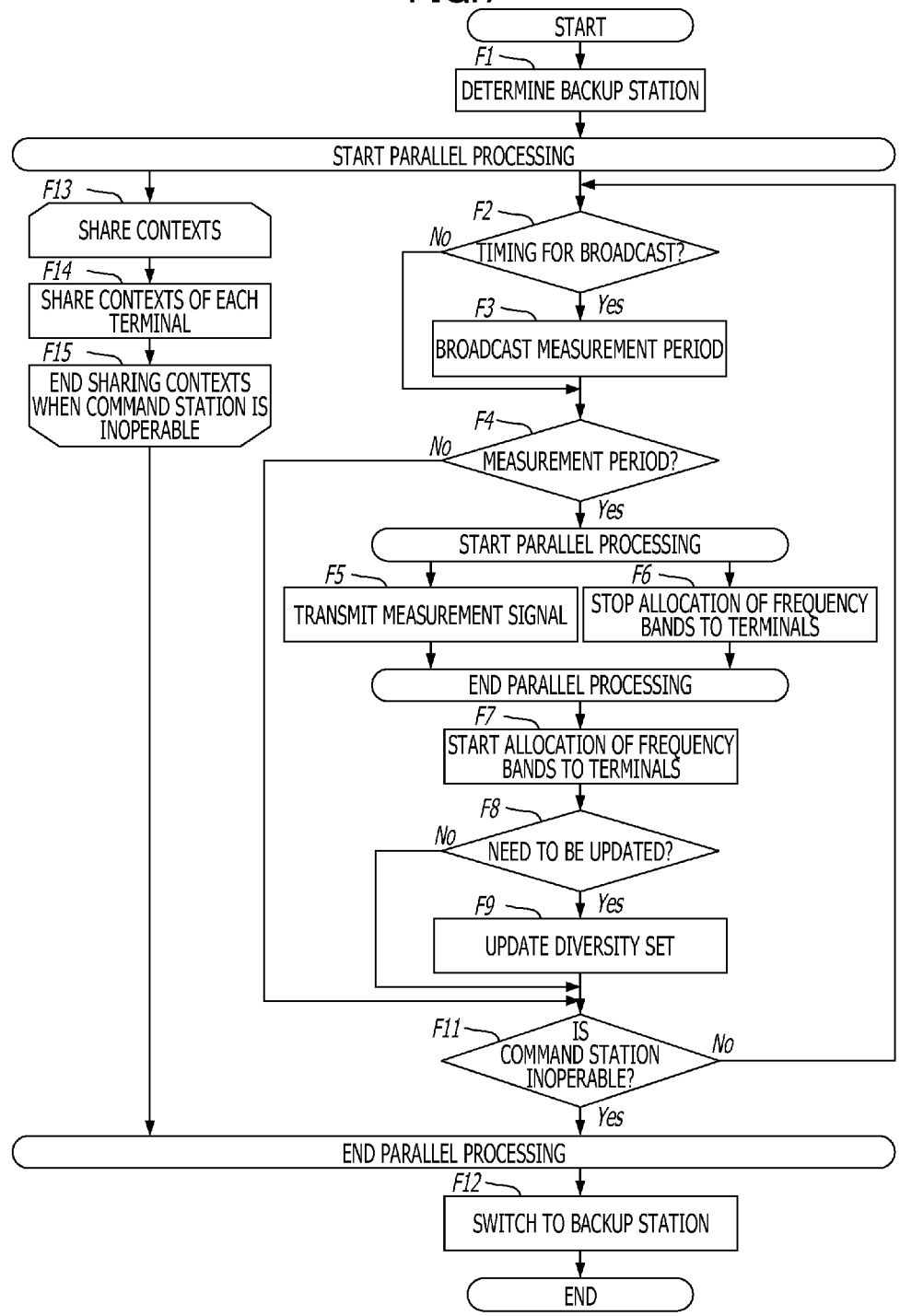
FIG. 7 is a flowchart of the first embodiment.

FIG. 7 is a flowchart of the first embodiment. As shown in FIG. 7, in parallel with processing in which the command station and the backup station share contexts of the terminals, processing in which each terminal measures the reception quality of radio waves from the backup station and maintains the diversity set is performed.

In step F1, the command station determines the backup station. Step F1 corresponds to step S1 in FIG. 4.

In step F2, the command station determines whether or not it is the timing for broadcasting the backup station and the periodic measurement periods. The timing of broadcasting is, for example, periodic timing predetermined by the frame number, time, time cycle, or the like.

In step F3, the command station broadcasts the backup station and the periodic measurement periods in which the reception quality should be measured. Step F3 corresponds to step S8 in FIG. 4.

In step F4, the command station, the backup station, and the terminals respectively determine whether or not it is the measurement period. Step F4 corresponds to step S9 in FIG. 4.

In step F5, the backup station transmits the measurement signal, and the terminals receive the measurement signal and measure the reception quality. Step F5 corresponds to step S9 in FIG. 4.

In step F6, in parallel with step F5, the command station stops the allocation of the frequency bands to the terminals. Step F6 corresponds to step S9 in FIG. 4.

In step F7, when the measurement period ends, the command station restarts the allocation of the frequency bands to the terminals.

In step F8, each terminal determines whether or not the diversity set needs to be updated on the basis of the measurement result of the reception quality. When the diversity set is updated, each terminal notifies the command station of the updated diversity set.

In step F9, the command station updates the diversity set as needed on the basis of the notification from each terminal. Step F9 corresponds to steps S10 and S11 in FIG. 4.

In step F11, the backup station and the terminals determine whether or not the command station is inoperable, and if the command station is not inoperable, the backup station and the terminals continuously perform communication between terminals. If the command station is inoperable, the process proceeds to step F12. Step F11 corresponds to step S12 in FIG. 4.

In step F12, the backup station starts operating as a command station, and the terminals switch the backup station to the command station. Step F12 corresponds to steps S12 to S15 in FIG. 4.

In steps F13 to F15, in parallel with steps F2 to F11, the command station and the backup station repeatedly share the contexts of the terminals. When the command station becomes inoperable, in step F15, the command station and the backup station end the sharing of the contexts, and the process proceeds to step F12.

In this embodiment, a system in which each terminal has a context different from each other is assumed, and the command station and the backup station share the contexts different for each terminal. The command station and the backup station transmit/receive the contexts between them to share the contexts. However, the processing to share the contexts may be omitted when all the terminals hold the same context before the wireless communication network among the terminals is constructed and the context is not changed while the wireless communication network among the terminals is operating. In this case, steps F13 to F15 are not performed.

According to this embodiment, quick switching from the command station to the backup station can be realized in the wireless communication network among the terminals.

Second Embodiment

In a second embodiment, the timing when the backup station starts transmitting frames is different from that in the first embodiment. In the second embodiment, after the command station becomes inoperable, the backup station starts transmitting frames at a timing corresponding to the timing of transmitting the reception quality measurement signal which the backup station transmitted before detecting the inoperability.

Figure 8:
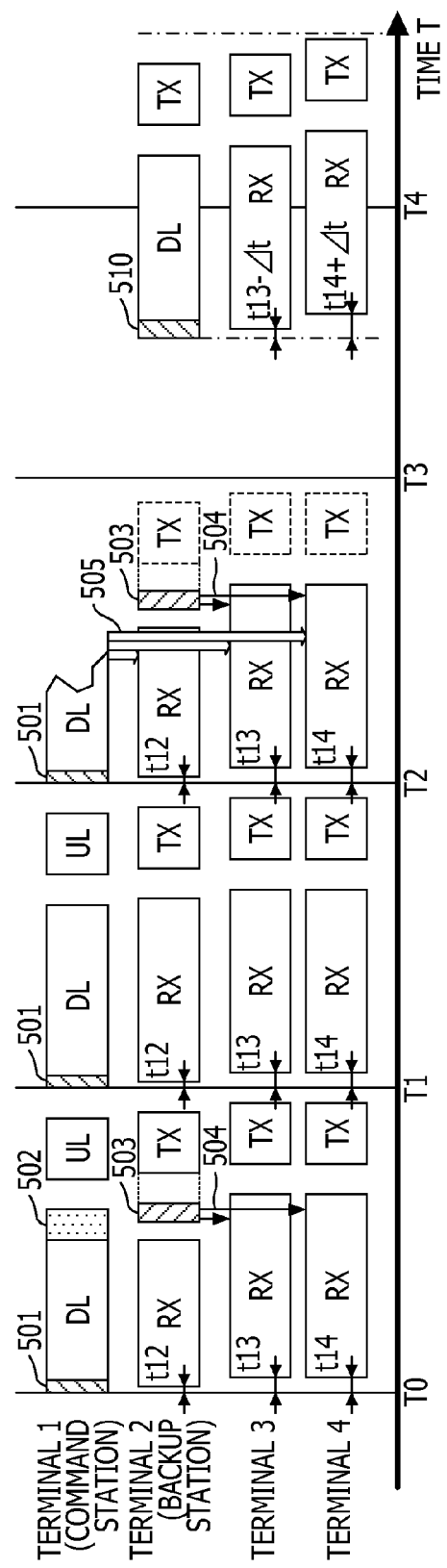
FIG. 8 is a diagram for explaining a frame configuration transmitted/received to/from a command station, a backup station, and terminals of the second embodiment.

Points different from the first embodiment will be described with reference to FIG. 8. FIG. 8 is a diagram for explaining a frame configuration transmitted/received to/from the command station, the backup station, and the terminals of the second embodiment. Hereinafter, the embodiment will be described using the network configuration in FIG. 1, the frame configuration in FIG. 2, and the configurations of the command station, the backup station, and the terminal in FIG. 3.

When the command station becomes inoperable (505) in the period T2-T3, in the period T3-T4, the backup station starts transmitting frames (510) at a timing corresponding to the timing 503 at which the backup station transmitted the measurement signal. Since the backup station transmitted the measurement signal 504 at the above described timing before the command station becomes inoperable, the backup station knows the timing, so that the backup station can start transmitting frames at a timing corresponding to the timing.

On the other hand, terminal 3 expects that the backup station starts transmitting frames at a timing corresponding to a timing at which terminal 3 received the measurement signal (for example, the preamble signal 504) from the backup station during the measurement period 503 before the command station becomes inoperable. Therefore, terminal 3 can start receiving frames from the backup station at a timing corresponding to the above timing.

As described in the first embodiment, the time Δt is an allowable delay for terminal 3, and hence terminal 3 can synchronize with the backup station immediately. The terminal 3 needs to know in advance whether the backup station starts transmitting frames at the timing at which the command station starts transmitting frames or at the timing at which the backup station transmits the measurement signal. Therefore, for example, the command station broadcasts the periodic measurement periods and the timing at which the backup station starts transmitting frames simultaneously.

The terminal 4 operates in the same way as terminal 3.

According to this embodiment, quick switching from the command station to the backup station can be realized in the wireless communication network among the terminals.

Third Embodiment

In a third embodiment, the command station selects a plurality of backup stations from a plurality of terminals and sets priorities on them. The command station broadcasts the plurality of backup stations and the periodic measurement periods in which the terminals should measure the reception quality of each backup station.

Further, in this embodiment, the plurality of terminals measure the reception quality from each backup station during the measurement periods. On the basis of the measurement result, each terminal holds a plurality of backup stations in a diversity set which includes synchronization parameters for synchronizing with other stations and is a list of other stations which can synchronize with the terminal by the synchronization parameters.

Points different from the first embodiment will be described with reference to a sequence diagram of the third embodiment shown in FIG. 9. Hereinafter, the embodiment will be described using the network configuration in FIG. 1, the frame configuration in FIG. 2, and the configurations of the command station, the backup station, and the terminal in FIG. 3.

In step S1, terminal 1, which is the command station, determines the backup station by the same method as described in [First Embodiment]. However, in this embodiment a plurality of backup stations are selected, and priorities are set on them. For example, the higher the reception quality of a backup station is, the higher the priority is set on the backup station.

In FIG. 9, the command station selects the terminal 2 and terminal 3 as backup stations, and sets the higher priority on terminal 2. When the command station becomes inoperable, terminal 2 becomes the command station. When the command station and terminal 2 become inoperable, terminal 3 becomes the command station. Hereinafter, terminal 2 is referred to as a backup station 1, and terminal 3 is referred to as a backup station 2.

In steps S2a and S3a, the command station shares the contexts of the terminals not only with the backup station 1 but also with the backup station 2 in the same procedure as steps S2 and S3 (FIG. 4) in the first embodiment.

In steps S6a and S7a, the command station shares the updated contexts of the terminals not only with the backup station 1 but also with the backup station 2 in the same procedure as steps S6 and S7 (FIG. 4) in the first embodiment.

In step S8, in the same procedure as step S8 (FIG. 4) in the first embodiment, the command station broadcasts that the backup stations are terminal 2 and terminal 3, the priority order of them is: terminal 2, terminal 3 in descending order, the periodic measurement period (1) in which the reception quality of the backup station 1 is measured, and the periodic measurement period (2) in which the reception quality of the backup station 2 is measured. In FIG. 9, the priority order is represented as an order of broadcasted backup stations. Although two backup stations are selected in this embodiment, three or more backup stations may be selected.

In step S9a, in the same procedure as step S9 (FIG. 4) in the first embodiment, the backup station 2 transmits the measurement signal in a frequency channel which synchronizes with the command station and is the same as the frequency channel of the command station. The measurement periods of the backup station 2 are different from the measurement periods of the backup station 1.

The command station stops the allocation of the frequency bands to a plurality of terminals during the measurement periods of the backup station 1 and the backup station 2.

Based on this, the terminals need not transmit/receive radio waves to/from the command station, and hence the terminals can receive the measurement signal from the backup station 1 and the backup station 2.

On the other hand, during the measurement periods, the backup station 1 and the backup station 2 need not transmit/receive radio waves to/from the command station, and hence the backup station 1 and the backup station 2 can transmit the measurement signal.

In steps S10 and S11, in the same procedure as steps S10 and S11 (FIG. 4) in the first embodiment, the terminals update the diversity set. In this embodiment, a point that the diversity set includes not only the backup station 1 but also the backup station 2 is different from the first embodiment.

It is assumed that the backup station 1 becomes inoperable at approximately the same time as when the command station becomes inoperable in step S12a. For example, after terminal 3 and terminal 4 detect that the command station becomes inoperable, when terminal 3 and terminal 4 try to receive the downlink signal of the backup station 1 but cannot receive the downlink signal for a certain period, terminal 3 and terminal 4 determine that the backup station 1 also becomes inoperable. Thereafter, the backup station 2 starts transmitting frames in the same way as in the first embodiment.

In steps S13 and S14, the backup station 2 and terminal 4 transmits/receives the control signal indicating that the command station is changed in the same procedure as steps S13 and S14 (FIG. 4) in the first embodiment.

According to this embodiment, when the command station and a plurality of backup stations become inoperable at the same time or in a successive manner, it is possible to quickly switch to the next operable backup station.

Although terminal 4 is not selected as a backup station in this embodiment, all the terminals may be prioritized and selected as backup stations.

Fourth Embodiment

In this embodiment, the backup station detects that the command station becomes inoperable and broadcasts that the command station becomes inoperable to a plurality of terminals during a measurement period.

Points different from the first embodiment will be described with reference to a sequence diagram of the fourth embodiment shown in FIG. 10. Hereinafter, the embodiment will be described using the network configuration in FIG. 1, the frame configuration in FIG. 2, and the configurations of the command station, the backup station, and the terminal in FIG. 3.

It is assumed that the command station becomes inoperable in step S12. The backup station monitors the downlink signal of the command station, and when the backup station cannot receive the downlink signal for a predetermined time period, the backup station determines that the command station becomes inoperable.

In step S9b, the backup station transmits the measurement signal and a flag indicating that the command station become inoperable during a measurement period to a plurality of terminals. Each terminal recognizes that the command station becomes inoperable on the basis of the reception of the flag. Step S9b is performed in the first measurement period after the command station becomes inoperable.

In the first embodiment, each terminal monitors the downlink signal of the command station to recognize that the command station becomes inoperable. However, since the reception environment of the downlink signal may be different between the backup station and terminals, the backup station and the terminals not necessarily recognize at the same time that the command station becomes inoperable. When the timing at which the backup station and a terminal recognize that the command station becomes inoperable is different, the timing at which the backup station starts transmitting frames as a command station is different from the timing at which the terminal expects that the backup station starts transmitting frames as a command station, and hence, in some cases, the backup station and the terminal transmit radio wave at the same time, and the backup station and the terminal may become an interference source to each other.

Therefore, in this embodiment, this problem is avoided by matching these timings.

According to this embodiment, after the command station becomes inoperable, a plurality of terminals can match the timings of switching to the backup station.

Fifth Embodiment

In this embodiment, the command station broadcasts periodic adjustment periods in which a plurality of terminals should adjust transmission power to the backup station. In the adjustment periods, the command station stops the allocation of the frequency bands to the plurality of terminals, the backup station allocates a frequency band for transmitting an adjustment signal for adjusting the transmission power to the plurality of terminals, and instructs each terminal to adjust the transmission power.

Further, in this embodiment, the backup station transmits an instruction for adjusting the transmission power to the terminals by adding the instruction to the measurement signal described above.

Or, in this embodiment, the backup station transmits the instruction for adjusting the transmission power to the terminals via the command station.

Since the terminal can synchronize with the backup station immediately by the first embodiment, at the same time, the terminal can start receiving the downlink signal from the backup station. However, when the environment in which the backup station and the terminal transmit/receive radio waves changes, the transmission power from the terminal to the backup station needs to be further adjusted. The backup station may not be able to decode the uplink signal from the terminal unless the transmission power is adjusted within a range of adjustment values. Unnecessarily large transmission power may uselessly consume battery of the terminal.

Therefore, in this embodiment, adjustment of the transmission power between the backup station and the terminal is completed before the command station becomes inoperable.

According to this embodiment, the adjustment of the transmission power between the backup station and the terminal can be completed before the command station becomes inoperable. Based on this, it is possible to immediately start transmitting user data of uplink after switching to the backup station.

For example, the adjustment of the transmission power is realized when the terminal transmits a signal for adjusting the transmission power to the backup station and the backup station returns an instruction for adjusting the transmission power to the terminal on the basis of the reception result of the signal. The instruction is, for example, an instruction for increasing the transmission power by a certain value or decreasing the transmission power by a certain value. The adjustment may be performed repeatedly.

Points different from the first embodiment will be described with reference to a sequence diagram of the fifth embodiment shown in FIG. 11 and a diagram for explaining a frame configuration transmitted/received to/from the command station, the backup station, and the terminals of the fifth embodiment shown in FIG. 12. Hereinafter, the embodiment will be described using the network configuration in FIG. 1, the frame configuration in FIG. 2, and the configurations of the command station, the backup station, and the terminal in FIG. 3.

In step S8, the backup station management unit 302 of the command station broadcasts a fact that the backup station is terminal 2, the periodic measurement periods in which the reception quality of the backup station should be measured, the periodic adjustment periods in which the transmission power of the terminal should be adjusted, and the allocation of the frequency band for each terminal to transmit the adjustment signal during the adjustment period.

In step S9c, the terminal transmits the adjustment signal used to adjust the transmission power to the backup station. The command station stops the allocation of the frequency bands to a plurality of terminals during the adjustment period. Based on this, during the adjustment period, the terminals need not transmit/receive radio waves to/from the command station, and hence the terminals can transmit the adjustment signal to the backup station. On the other hand, during the adjustment period, the backup station also need not transmit/receive radio waves to/from the command station, and hence the backup station can receive the adjustment signal from the terminals.

The frame configuration in step S9c is shown in the period T1-T2 in FIG. 12. The command station sets the adjustment period at the timing of switching from RX to TX in the period T1-T2. By setting the timing of switching from RX to TX as the adjustment timing, it is possible to avoid occurrence of unnecessary switching between RX and TX in the backup station and the terminals.

In step S9d, the backup station transmits an instruction for adjusting the transmission power to the terminals by adding the instruction to the measurement signal on the basis of the reception result in step S9c (corresponding to 522 in FIG. 12). Each terminal adjusts the transmission power in accordance with the instruction for adjusting the transmission power. The frame configuration in step S9d is shown in the period T2-T3 in FIG. 12.

In steps S16 and S17, the backup station transmits the instruction for adjusting the transmission power to the terminals via the command station on the basis of the adjustment signal received in step S9c. The transmission of the instruction for adjusting the transmission power may be realized by the procedure of step S9d or steps S16 and S17.

According to this embodiment, the adjustment of the transmission power between the backup station and the terminal can be completed before the command station becomes inoperable. Based on this, it is possible to immediately start transmitting user data of uplink after switching to the backup station.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A wireless communication network system comprising:
a command station for allocating a frequency band, broadcasting a backup station and periodic measurement periods in which a terminal should measure a reception quality, and stopping the allocation of the frequency band to the terminal during the measurement period;
one or a plurality of backup stations for synchronizing with the command station and transmitting a measurement signal by using the same frequency channel as that of the command station; and
one or a plurality of terminals for measuring a reception quality for each backup station by using the measurement signal.

2. The wireless communication network system according to claim 1, wherein
the terminal notifies the command station of the backup station having a result of the measurement greater than a predetermined value and stores synchronization information for synchronizing with the backup station.

3. The wireless communication network system according to claim 1, wherein
the command station further broadcasts periodic adjustment periods in which transmission power should be adjusted, and
in the adjustment period, the terminal transmits an adjustment signal by using a frequency band allocated by the backup stations and the backup stations instruct the terminal to adjust transmission power on the basis of the adjustment signal.

4. The wireless communication network system according to claim 1, wherein
the command station further broadcasts a priority of the backup station.

5. The wireless communication network system according to claim 1, wherein
when the backup station detects that the command station becomes inoperable, the backup station starts transmitting frames at a timing synchronized with a head of a frame of the command station, the measurement period, or the adjustment period.

6. The wireless communication network system according to claim 1, wherein
the backup station notifies the plurality of terminals that the command station becomes inoperable.

7. The wireless communication network system according to claim 1, wherein
the command station notifies the backup station of a context of the plurality of terminals.

8. The wireless communication network system according to claim 1, wherein
the backup station transmits an instruction for adjusting the transmission power to each terminal via the command station.

9. The wireless communication network system according to claim 1, wherein
the command station performs the broadcast by using a neighbor base station advertisement message.

10. The wireless communication network system according to claim 1, wherein
the reception quality is a carrier to interference and noise ratio (CINR) or a received signal strength indicator.

11. A wireless communication method comprising:
by a command station, broadcasting one or a plurality of backup stations synchronizing with the command station and periodic measurement periods in which a terminal should measure a reception quality; and during a measurement period, stopping allocation of a frequency band to the terminal by the command station, transmitting a measurement signal by using the same frequency channel as that of the command station by the backup station, and measuring a reception quality for each backup station by using the measurement signal by the terminal.

12. The wireless communication method according to claim 11, further comprising:
notifying the command station of the backup station having a result of the measurement greater than a predetermined value and storing synchronization information for synchronizing with the backup station.

13. The wireless communication method according to claim 11, further comprising:
further broadcasting periodic adjustment periods in which transmission power should be adjusted, and
in the adjustment period, transmitting an adjustment signal by using a frequency band allocated by the backup stations and the backup stations instruct the terminal to adjust transmission power on the basis of the adjustment signal.

14. The wireless communication method according to claim 11, further comprising:
further broadcasting a priority of the backup station.

15. The wireless communication method according to claim 11, further comprising:
when the backup station detects that the command station becomes inoperable, by the backup station, starting transmitting frames at a timing synchronized with a head of a frame of the command station, the measurement period, or the adjustment period.

16. The wireless communication method according to claim 11, further comprising:
notifying the plurality of terminals that the command station becomes inoperable.

17. The wireless communication method according to claim 11, further comprising:
notifying the backup station of a context of the plurality of terminals.

18. The wireless communication method according to claim 11, further comprising:
transmitting an instruction for adjusting the transmission power to each terminal via the command station.

19. The wireless communication method according to claim 11, further comprising:
performing the broadcast by using a neighbor base station advertisement message.

20. The wireless communication method according to claim 11, wherein
the reception quality is a carrier to interference and noise ratio (CINR) or a received signal strength indicator.

* * * * *